Patented July 17, 1923.

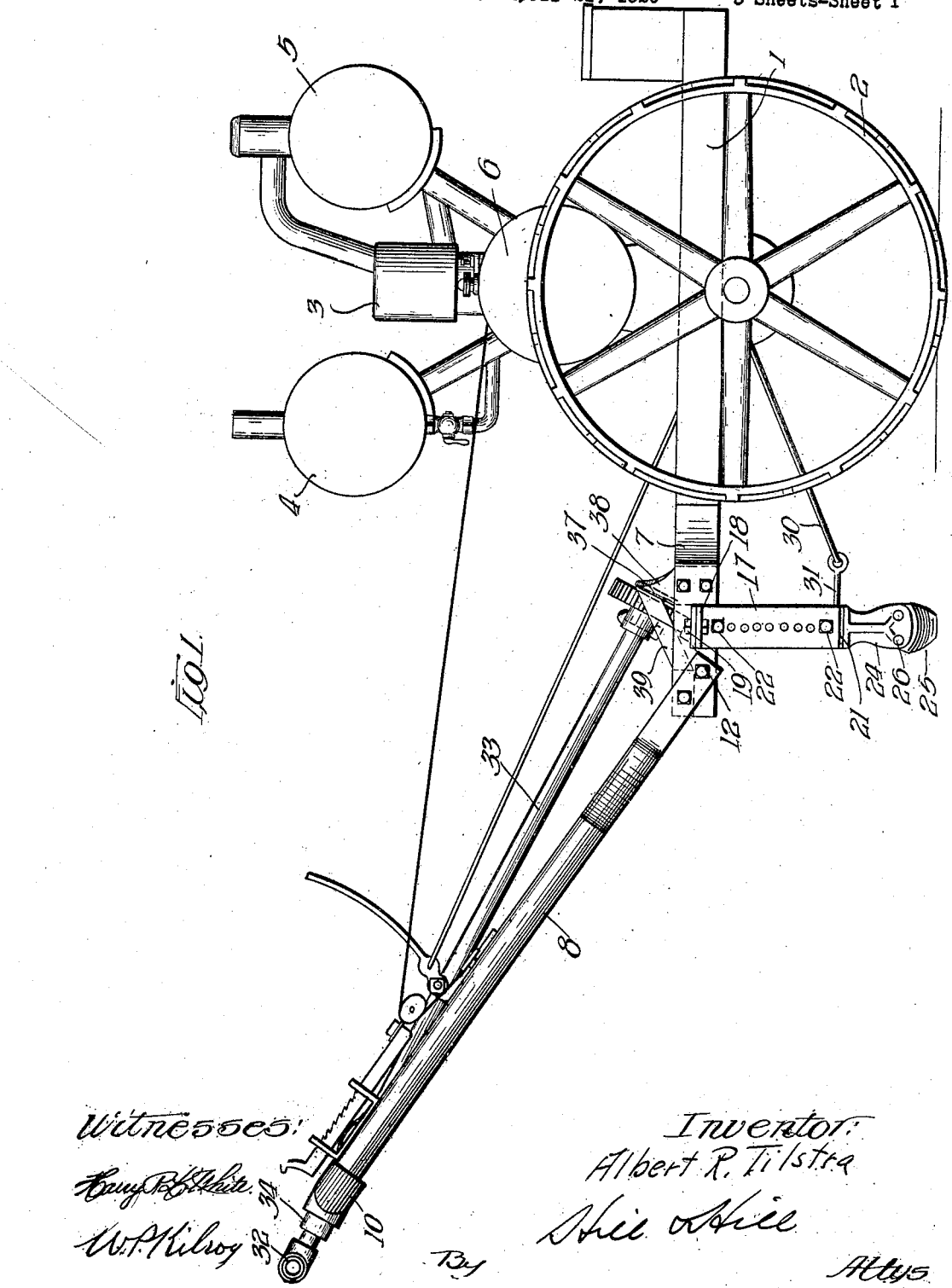

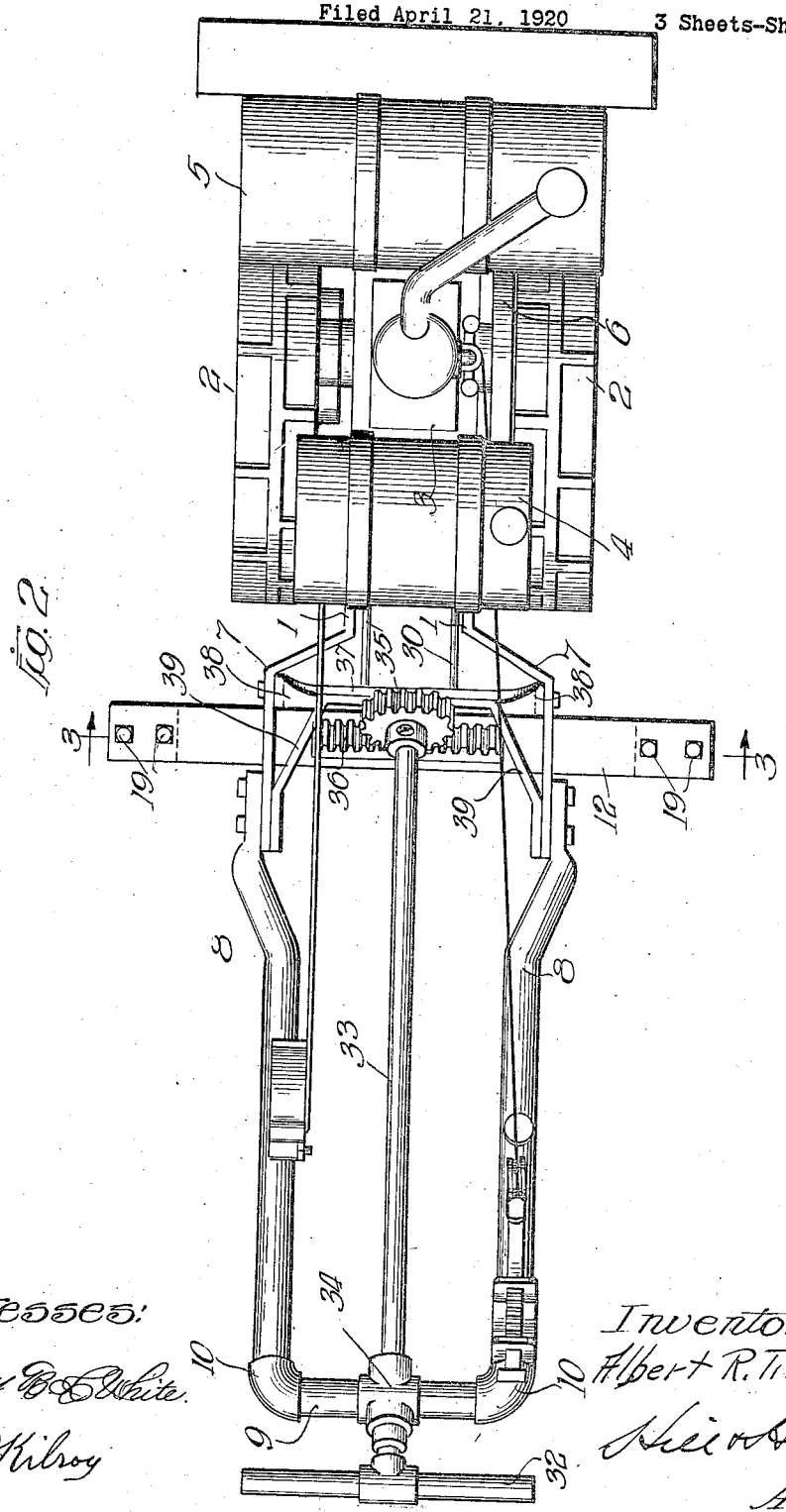

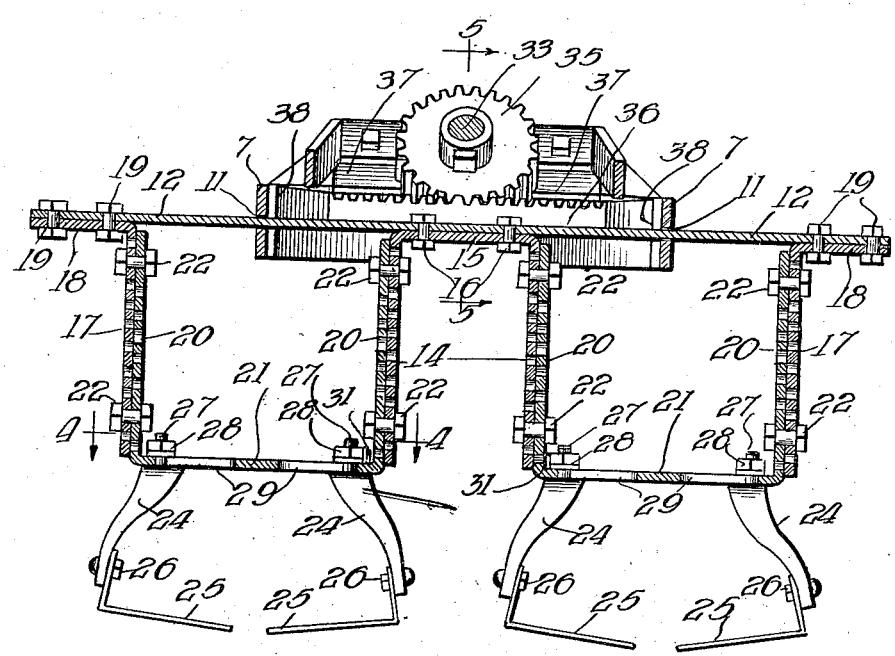

1,462,155

UNITED STATES PATENT OFFICE.

ALBERT R. TILSTRA, OF SOUTH HOLLAND, ILLINOIS.

TRACTOR ATTACHMENT.

Application filed April 21, 1920. Serial No. 375,517.

*To all whom it may concern:*

Be it known that I, ALBERT R. TILSTRA, a citizen of the United States, residing at South Holland, in the county of Cook and State of Illinois, have invented certain new and useful Improvements in a Tractor Attachment, of which the following is a description.

My invention belongs to that general class of devices known as tractor attachments and relates particularly to a cultivator or plow attachment or the like adapted to be used in connection with that type of tractor in which the operator usually walks in back guiding the machine and controlling the apparatus propelled thereto. The device, however, may be employed upon any type of tractor or vehicle to which the same may be applicable. The invention has among its objects the production of a device of the kind described, that is simple, compact, convenient, efficient, reliable and satisfactory for use wherever found applicable. The same has particularly as an object the production of a device of the kind described which may be easily and quickly controlled whereby injury to the plants being cultivated may be avoided. Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts, Figure 1 is a side elevation of my improved attachment applied for use on a tractor;

Figure 2 is a plan view of the same;

Figure 3 is a sectional view taken substantially on line 3—3 of Figure 2;

Figure 4 is a sectional view taken substantially on line 4—4 of Figure 3; and

Figure 5 is a sectional view taken substantially on line 5—5 of Figure 3.

Referring to the drawings, in order that the application of my device may be clear, I have shown the same attached to a form of tractor having one or more wheels 2, carrying a frame 1, 3 being a gas-engine or other source of power. In the machine shown, 4 represents a gasoline-tank or the like, 5 a water-tank or the like, 6 the flywheel of the engine, it being understood that the engine is operatively connected with the driving wheels 2 in any suitable manner, and that the tractor driving mechanism is controlled as desired. As shown, I provide frame bars 7—7, which may be attached to the tractor frame 1 in any suitable manner. The frame handle-bars 8—8 are preferably adjustably secured to the frame bars 7—7 and afford a means of manipulating the tractor when desired, and also a support for my improved controlling mechanism, which is adapted to not only steer or control the travel of the tractor, but also control the travel or movement of the cultivators, as will be hereinafter described. By adjustably securing the handle-bars 8 in place they may be adjusted to the best height for the operator. As shown, the handles 8—8 are connected by the crosshead 9—9, 19 being suitable fittings for securing the parts together, there being intermediate fittings 34 which I shall later describe.

As most clearly shown in Figure 3, the frame bars 7—7 are preferably slotted as at 11—11 and carry an adjustable or movable bar 12. The bar 12 is provided with means for connecting the shovels, plows or the like, of the cultivator thereto, it being understood that they may be attached thereto in any desired manner, and that the bar may be of sufficient length to carry any desired number of cultivator plows. As shown, I provide a U shaped member consisting of the legs 14, connected by the part 15, which is secured to the bar 12 between the frame bars 7—7, by bolts 16 or the equivalent. I also secure the members consisting of the depending portions 17 and the extending portion 18, which are secured to the bar by bolts 19, or their equivalents. The legs 14 and depending bars 17 carry a U shaped frame at each side, consisting of the legs 20 and connecting portions 21, the same being secured to the parts 14 and 17 in any suitable manner. As shown, I secure the parts together by means of bolts 22, it being understood that there may be any desired number of additional holes so as to provide different adjustments. Each of the members 20—21—20 carries the desired shaped shovels, plows. or cultivators, which may be attached thereto in any suitable manner. As shown, I provide brackets or members 24 to which are secured the shovels 25 of the desired type. I have shown the shovels 25 secured to the brackets 24 by bolts 26 so that they may be adjusted as required. I have shown the brackets 24 secured to the U shaped part of the extending portions by bolts 27 and nuts 28. It will be noted by referring to Figures 3 and 4 that I preferably slot the U shaped parts as indicated at 29, so that the shovels may be adjusted laterally, as may be found necessary. Obviously as the bar 12 is shifted lengthwise the shovels carried thereby will likewise be shifted. The bar may be provided with any suitable actuating mechanism preferred so that it may be operated from adjacent the free end of the handles. As shown, I provide a shaft 33, having a handle 32, the shaft extending through the fitting or bearing member 34. Secured to shaft 33 is a gear 35 arranged to cooperate with a rack bar 36 mounted on and secured to the bar 12. I prefer to support the end of the shaft adjacent the gear 35, and for this purpose I provide a bracket member consisting of the cross bars 37 having depending legs 38 arranged for attachment to the bars 7. This member may be braced by the brace members 39, as indicated in Figure 2. I have illustrated in Figure 1, a brace rod consisting of the parts 30 and 31, which are connected to the frames 20—21—20 and to the tractor frame 1, or the equivalent.

It is believed that the operation of the device will be clear from the preceding description and drawings. Assuming that the tractor is moving along its path, the operator walking behind steers the same by means of a handle-bar 32 in the same manner as he would by the handle-bars 8. In case the machine does not run entirely straight, or that it sheers off to one side, or the plant is out of alignment with the other plants, the operator by manipulating the handles 32, and partially rotating shaft 33 may quickly shift the bar 12 and the cultivators connected therewith, so as to avoid injuring the plants. This can be done much quicker than would be possible to throw the machine. In addition, drawing the handles 8—8 to one side without independently controlling the cultivators may have a tendency to throw the cultivator blades too far the other way. With my improved attachment, the operator may throw the handles to turn the machine and at the same time turn the shaft 33 to control the cultivators and move them in the opposite directions just the desired distance to avoid injury to the plants. The operator is thereby enabled to turn the machine without stopping it or slowing up, and at the same time without removing his hands to control the cultivators and maintain them in their proper line of travel. The device is exceedingly simple and there is nothing to get out of order or require constant adjustment. The same is applicable for use on practically any type of tractor, particularly the types similar to that illustrated and described, and may be constructed to cultivate one or more rows. The device, not only prevents injury to the crop, but likewise is a time saver as it is not necessary to slow down or stop the machine in order to turn it should the same veer to one side.

Having thus described my invention it is obvious that immaterial modifications may be made in the same without departing from the spirit of my invention; hence I do not wish to be understood as limiting myself to the exact form, arrangement, construction and combination of parts herein shown and described or uses mentioned.

What I claim as new and desire to secure by Letters Patent is:

1. In a device of the kind described and in combination, a cultivator frame adapted to be connected to the rear of a driving means and having a pair of registering slots therethrough in a horizontal plane, a bar slidable through said slots in a straight line transversely of the direction of travel of said driving means, cultivator mechanism suspended from said bar, means for adjusting said mechanism vertically of said bar, a rock shaft extending rearwardly and upwardly of said bar, a controlling handle at the rear end of said shaft and a gear at the forward end thereof, and a rack on said bar between the slotted sides of the frame, said rack meshing with said gear and being limited at the ends of its movement in both directions by abutting against said sides of the frame.

2. In a device of the kind described and in combination, a cultivator frame adapted to be connected to the rear of a driving means and having a pair of registering slots therethrough in a horizontal plane, a bar slidable through said slots in a straight line transversely of the direction of the travel of said driving means, cultivator mechanism suspended from said bar, means for adjusting said bar, and means for actuating said bar comprising a shaft arranged transversely thereof, a controlling handle at the end of the shaft, a gear at the forward end of the shaft, and a rack on said bar to mesh with said gear, said rack adapted to abut against the sides of the frame to limit its movement in both directions.

In testimony whereof, I have hereunto signed my name in the presence of two subscribing witnesses.

ALBERT R. TILSTRA.

Witnesses:
Roy W. Hill,
Bertha Hartmann.